United States Patent [19]
Burnett

[11] 3,848,705
[45] Nov. 19, 1974

[54] APPLICATION ADJUSTER FOR DISC BRAKE
[75] Inventor: Richard T. Burnett, South Bend, Ind.
[73] Assignee: The Bendix Corporation, South Bend, Ind.
[22] Filed: Aug. 13, 1973
[21] Appl. No.: 387,876

[52] U.S. Cl............................ 188/71.9, 188/196 F
[51] Int. Cl............................................ F16d 65/56
[58] Field of Search.............. 188/71.8, 71.9, 106 F, 188/196 F, 196 BA

[56] References Cited
UNITED STATES PATENTS
3,211,263  10/1965  Harrison .................... 188/71.9 X
3,550,728  12/1970  Seip ................................ 188/71.8

*Primary Examiner*—Duane A. Reger
*Attorney, Agent, or Firm*—Ken C. Decker; William N. Antonis

[57] ABSTRACT

An automatic adjuster mechanism for a caliper disc brake is provided with a screw member threadedly connected to the brake piston to be extended therefrom upon relative rotation between the screw and piston to adjust the friction members with respect to the rotor. The brake is actuated by a lever operated rotatable cam which when rotated drives the piston and caliper in opposite directions so that the friction members, to which the caliper housing is operatively connected, are urged into frictional engagement with the rotor. Cam rotation also drives a spring clutch mechanism, interconnected between the cam and the screw member, after the cam has rotated a predetermined distance to cause rotation of the screw with respect to the piston if lining wear has occurred so that the screw is extended from the piston. The spring clutch includes two coil springs operatively connected in series relationship between two coaxial sleeves with which the springs respectively are in frictional enagement at torque levels which are predetermined for brake application and for release so that one spring will drive and the other will slip at predetermined torque levels upon a brake application and upon release said one spring will slip at a predetermined torque level and said other spring will drive.

10 Claims, 2 Drawing Figures

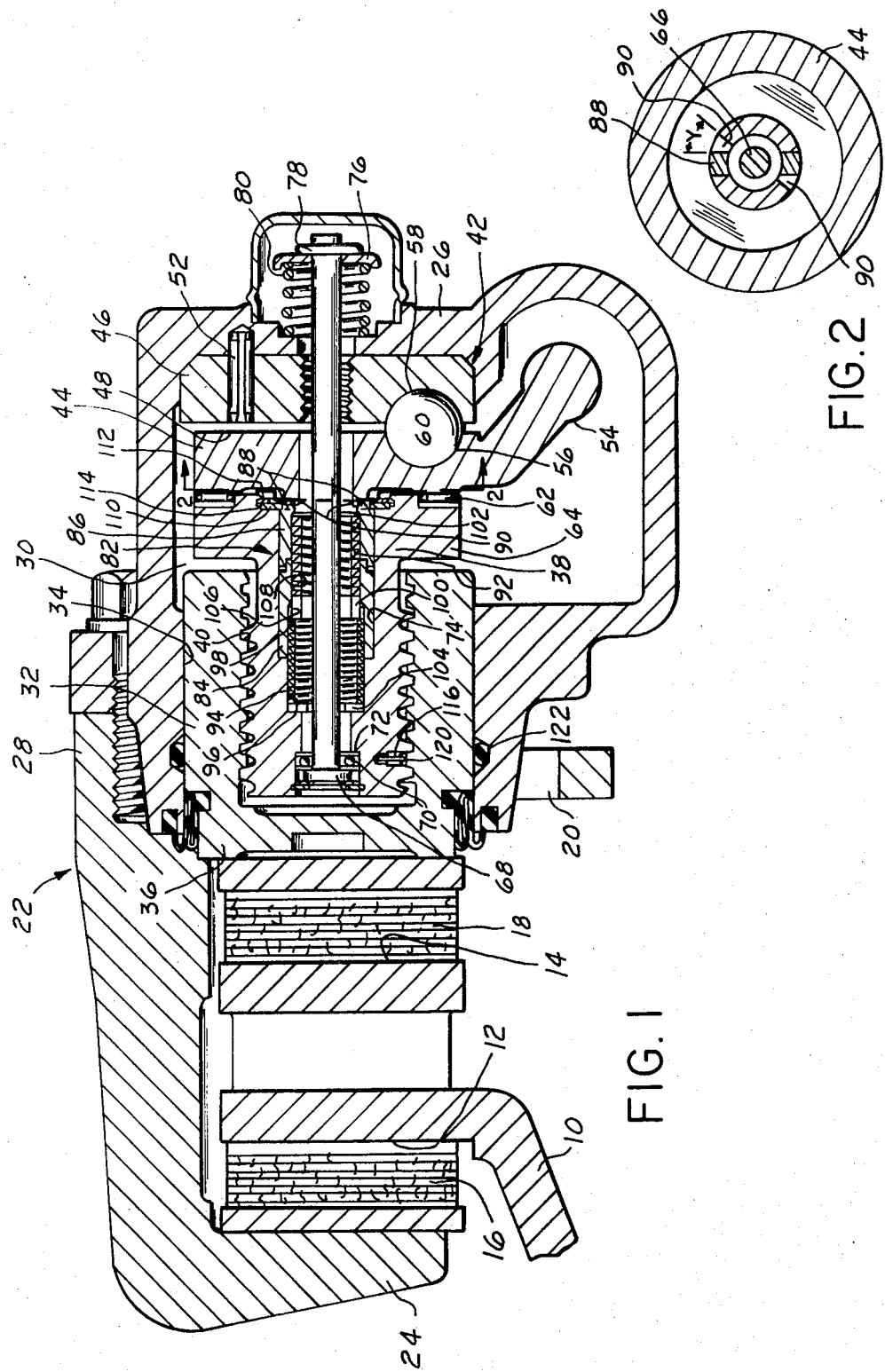

3,848,705

APPLICATION ADJUSTER FOR DISC BRAKE

BACKGROUND OF THE INVENTION

This invention relates to an automatic adjuster for a disc brake.

Maintaining a preselected clearance between the friction members of the brake and the friction faces of the rotor has always been a major consideration in brake design since it is the very essence of optimum brake performance. The type of mechanism employed for achieving the adjustment is determined somewhat by the form of brake actuation, i.e., hydraulic, air, mechanical etc. Moreover, it is only recently that disc brakes have been used on commercial vehicles and such use has been slower than expected, due principally, it is believed, to the limited applying stroke of mechanical actuators of the air type such as disclosed in copending U.S. Pat. application Ser. No. 238,547, filed Mar. 27, 1972, owned by the assignee of the present invention and incorporated herein by reference. Due to the limited stroke of such actuators, it becomes obligatory, in order to conform to the safety standards, to maintain optimum clearance between the friction members and the rotor faces. Many forms of spring-loaded adjusting mechanisms have been proposed for maintaining this clearance relationship as aforementioned. Some devices adjust on brake application and others adjust on brake release. A mechanism which adjusts on brake application is disclosed in U.S. Pat. application Ser. No. 243,794, filed Apr. 13, 1972, owned by the assignee of the present invention and incorporated herein by reference. A mechanism of the type which adjusts during brake release is disclosed in U.S. Pat. application Ser. No. 156,646, filed June 25, 1971, owned by the assignee of the present invention and incorporated herein by reference. Prior art brake adjustors have had the problem of too much adjustment which can lead to brake locking or too little adjustment which can lead to poor brake response or even "flooring" the brake pedal. The mechanism herein disclosed proposes to overcome these shortcomings.

SUMMARY OF THE INVENTION

Therefore, in view of the foregoing, it is an important object of my invention to provide an automatic adjuster for a disc brake which repositions the friction elements with respect to the rotor faces through the driving action of a two spring serially connected clutch during a brake application.

An important object of my invention is to provide an automatic adjuster for a disc brake which limits the torque level applied to the brake adjusting screw during braking and release.

Another important object of my invention is to provide an automatic adjuster with a spring clutch which uses two clutch springs to better regulate the variations in torque arising from tolerances on parts of the assembly.

BRIEF DESCRIPTION OF DRAWINGS

FIG. 1 is a view in section through a disc brake in which the adjuster mechanism of my invention is incorporated; and FIG. 2 is a sectional view taken along the line 2—2 of FIG. 1.

DETAILED DESCRIPTION

Referring now to the drawings, the numeral 10 designates a rotor mounted for rotation with a vehicle wheel, not shown, to be braked. The rotor is equipped with a pair of oppositely facing annular friction surfaces or faces 12 and 14 to be frictionally engaged respectively, by a pair of friction members 16 and 18 positioned adjacent the rotor. A torque member 20, secured to a fixed part of the vehicle, such as an axle flange, slidably supports a caliper housing 22, which may be mounted to the torque member 20 in any suitable manner such as illustrated in my U.S. Pat. No. 3,388,774, owned by the assignee of the present invention and incorporated herein by reference. The caliper housing 22 is formed with a portion 24 extending radially inwardly adjacent one side of the rotor 10 and another portion 26, extending radially inwardly along the side of and adjacent to the other side of the rotor. The radially extending portions 24 and 26 are connected together by a bridge member 28 which extends across the periphery of the rotor 10. The friction member 16 is suitably carried on the inwardly projecting leg portion 24 of the housing. The leg portion 26 is provided with a chamber 30 in which a piston 32 is slidably carried in a bore 34 so that an end 26 of the piston is adapted to project from the bore to engage the friction member 18 to move it against the rotor face 14. The piston 32 includes an adjustable screw member 38 threadably connected to the piston by threads 40 so that relative rotation between the piston part 32 and the screw part 38 in one direction causes the screw to extend from the piston, thereby lengthening the piston. It will be observed that the parts 32 and 38 together provide an extendible member, the function of which will be explained hereinafter in more detail, which is drivably connected to a brake actuating mechanism 42.

The brake actuating mechanism 42 is located in the chamber 30 of the caliper housing 22 and includes a pair of cam plates 44 and 46 provided respectively with contiguous faces 48 and 50. The cam plate 46 is secured against rotation by a pin 52 which penetrates the radial extending portion 26 of the caliper housing 22. The cam plate 44 is rotatably mounted adjacent the cam plate 46 and includes a lever arm 54 which may be operatively connected to any suitable actuating device such as the one disclosed in copending U.S. Pat. application Ser. No. 238,547, filed Mar. 27, 1972, owned by the assignee of the present invention and incorporated herein by reference. The cam plate faces 48 and 50 are formed respectively with a plurality of sets of opposing arcuately extending recesses 56 and 58 in which a force transmitting element 60 is carried. The sets of recesses 56 and 58 are circumferentially spaced around the cam plate faces in any suitable manner, dictated by design expedience. The recesses 56 and 58 are formed with inclined walls or ramps up which the force transmitting element or spherical member 60 is rolled upon rotation of the cam plate 44. This movement of the spherical member 60 in climbing or rolling up the ramps in the recesses, develops an axial force acting in the cam plate 44, urging it to the left, as viewed in FIG. 1, in a manner well known to those skilled in the art. This axial force developed in the cam 44 is directed into the screw 38, through a bearing 62, located between the cam plate 44 and a flange 64 of the screw 38, to provide for rotation between the cam 44 and screw 38. The frictional torque generated in the threads 40 opposing rotation of the screw member 38 in the piston part 32, is directly proportional to the aforementioned axial force acting in the cam plate 44. The cam plates 44 and 46, the radially extending portion 26 of the caliper housing and the screw 38 have axial passages therein, through which a rod 66 extends to retain the component elements of the actuating mechanism 42 in operating relationship. The inner end of the rod 66 is formed with a flanged end or head 68 which rides on a bearing 70 interposed between the flanged end and an abutment 72 located in a longitudinal stepped bore 74 of the adjustable screw 38. A spring retainer member 76 and a locking ring 78 are carried on the outer end of the rod 66 for abuttingly receiving a preloaded coil spring 80, interposed between the spring retainer member 76 and the leg portion 26 of the caliper housing, thereby providing a yieldable connection for the component elements of the actuating mechanism 42 which permits axial displacement or spreading of the cam plate 44 with respect to the cam plate 46 upon rotation of the lever 54 in a brake actuating direction. Also upon brake release the piston 32 is yieldably withdrawn away from the rotor face 14. Moreover, upon brake release, i.e., upon removing the brake actuating force from the lever 54, the spring 80 acts on the screw 38, cam plate 44 and spherical members 60, causing the latter to roll down the ramps of the recesses 56 and 58 to thereby return the cam plate 44 to its released position, shown in FIG. 2.

To compensate for wear of the friction members 16 and 18, an adjuster mechanism 82 connects the piston 32 with the cam plate 44 of the actuating mechanism 42 to reposition the piston and its associated friction lining member during a brake application. The adjuster mechanism 82 includes two sleeves 84 and 86 coaxially and rotatably disposed in end to end relationship in the stepped passage or bore 74 of the screw 38. The sleeve 86 is provided with prongs or nibs 88 which project into arcuate channels or slots 90 formed in the cam plate 44. These slots 90 are of a predetermined length such that the cam plate 44 is rotated counterclockwise through an angle Y, as shown in FIG. 2, before the end walls of the slots drivably engage the nibs 88, causing rotation of the sleeve 86. Rotation of the cam plate 44 counterclockwise, through an angle less than Y moves the piston axially to the left but does not rotate sleeve 86. The sleeves 84 and 86 are drivably connected together by a heavy coil spring 92 the coils of which frictionally engage the inner diameter wall portions of the respective sleeves at their adjacent ends. A lighter coil spring 94 is positioned within the stepped bore 74 so that the coils of the spring frictionally engage the smaller diameter wall 96 of the stepped bore and the inner diameter wall portion 98 of the sleeve 84 to thereby drivably connect the sleeve 84 to the screw part 38. The diameters of the coils of the respective springs 92 and 94 are greater than the diameters of the walls and bore into which the springs are inserted so that when installed, as shown in FIG. 1, the coils frictionally engage the walls 96, 98 and 108. A spacer 100 provides an abutment for the adjacent ends of the coaxial springs 92 and 94, thus locating the inner ends of these springs. The outer ends of the springs 92 and 94 are in abutting relationship respectively, with washers 102 and 104 to thereby confine the springs to a given axial position. The sleeve 84 is formed with a chamfer 106 at the junction of the larger inner diameter 98 and smaller inner diameter 108 to facilitate assembly of the heavy spring 92 within the sleeves. Axial displacement of the sleeves 84 and 86 in the stepped passage 74 is controlled by an annular member or washer 110 which abuttingly overlies an end of the sleeve 86. A fastening ring 112 is carried in a groove 114 of the screw part to retain the washer 110 in place. Controlling axial movement of the sleeves 84 and 86 permits closer control of the torques in the springs 92 and 94 which together with the sleeves provide a spring clutch assembly operatively connected between the cam 44 and screw 38. The frictional torques between the coils of the respective springs 92 and 94 and their associated inner diameter sleeve walls and stepped bore are proportional to the number of coils engaging the sleeve walls and bore and also to the diameter of the sleeve walls and bore.

For one direction of rotation of the cam plate 44, the frictional torque between the heavy spring 92 and the sleeves 86 and 84 is a predetermined lesser amount than the frictional torque between the lighter spring 94 and the sleeve 84 and bore 96 of the screw so that sufficient torque is transmitted to the screw 38 to rotate it relative to the piston 32 to make an adjustment, but allowing the heavy spring 92 to slip in the sleeve 86 when the torque acting on the threads 40 opposing rotation of the screw 38, reaches a predetermined maximum value. In other words, as will be appreciated by those skilled in the art, when a coiled spring is torqued in a direction tending to "unwind" the spring, the diameter of the spring coils tends to increase, while if the spring is torqued in a direction tending to wind the spring more tightly, the diameter of the spring coils tends to decrease. Furthermore, each of a pair of springs may be wound in opposite directions, so that if torques acting in the same direction are applied to each of the springs, the coils of one of the springs will increase in size and the coils of the other spring will be reduced. For the purposes of this application, when a spring is torqued in a direction "unwinding" the spring, consequently causing the diameter of the coils to increase in size, it is said to be rotated in an "energizing" direction. Conversely, when a spring is torqued in a direction winding the spring more tightly, it is said to be rotated in a "non-energizing" direction. Consequently, when springs 92 and 94 are rotated in an energizing direction, the diameter of the spring coils increases in size, thereby increasing the frictional forces between the springs and the sleeves 86, 84 and the bore 96, so that the springs will not slip until a higher torque level is attained. Similarly, if the springs 92 and 94 are rotated in the non-energizing direction, they will slip at a lower torque than the torque necessary to cause slippage when the springs are relaxed. Springs 92 and 94 are oppositely wound, so that when the springs are rotated in the one direction, heavy spring 92 is driven or rotated in the non-energizing direction but the light spring 94 is rotated or driven in the energizing direction. Upon rotation of the cam plate in the other direction the light spring 94, which is rotated in a nonenergizing direction, slips at some predetermined torque, while the heavy spring 92, which is now rotated in an energizing direction, is driving the sleeves and spring 94, the latter of which is slipping relative to the screw 38. In order to obtain closer torque control on the screw 38 upon brake release so that the prior adjustment of the screw and piston is not nullified, the threads 40 may be equipped with a drag spring 116 having an end 118 secured to the screw 38 and an end 120 frictionally engaging the threads of the piston 32. The combined resistance of the friction in the threads 40 and the drag spring 116 to rotation of the screw must be greater than the torque developed in the now nonenergizing spring 94 during brake release so that the spring 94 will slip relative to the screw. An annular seal 122, sealingly and frictionally interposed between the housing 22 and the piston 32, provides sufficient friction to resist rotation of the piston at times when the latter is not also resisted by frictional engagement with the friction member 18.

MODE OF OPERATION

Assume a brake application in which the lever 54 and cam plate 44 are rotated in a counterclockwise direction, as viewed in FIG. 2. This rotation of the cam plate causes the spherical members 60 to roll up the ramps of the recesses 56 and 58, forcing the cam plate to the left which drives the piston 32 and friction member 18 toward the rotor face 14. Upon frictional engagement between the friction member 18 and the rotor face 14, reaction forces are developed in the actuating mechanism 42 and caliper housing which slide the housing on the torque member 20, thereby forcing the friction member 16 against the rotor face 12 which effects braking.

If rotation of the cam plate 44 is less than the angle Y to establish frictional engagement of the friction members 16 and 18 with the rotor 10, a brake adjustment is not required. Should rotation of the cam be in excess of the angle Y, necessitating a brake adjustment, the end walls of the slots 90 will abut the nibs 88, rotating the sleeve 86 of the spring clutch to effect rotation of the screw 38 relative to the piston 32, thereby extending the screw from the piston to compensate for wear of the friction members. The frictional forces developed in the threads 40 by cam plate rotation during this adjustment are directly proportional to the axial force acting through the screw 38 and piston 32 and must be less than the torque developed by the frictional engagement of the spring 92 with the sleeves 86 and 84.

Therefore, as long as the brake actuating forces in the cam plate 44 are relatively low, the frictional torque in the threads 40 will also be correspondingly low, allowing the screw 38 to be rotated by the sleeve 86. In the event of a sudden brake application, as in a "panic stop," relatively high actuating forces are developed in the cam plate 44 and transmitted through the screw 38 and piston 32. Often these actuating forces are greater than the frictional torque developed between the spring 92 and its associated sleeves 86 and 84. When this happens, the heavy spring 92, which is rotated in a nonenergizing direction during a brake application, slips so that an adjustment cannot be effected under forces of such magnitude.

When the actuating force on the lever 54 is removed, the spring 80 withdraws the piston 32 from the rotor 10, releasing the brake. Concurrently with this release of the brake, a force is developed in the actuating mechanism 42 through the integrated action of the preloaded spring 80 and the spherical members 60 in their respective recesses 56 and 58, which returns the cam plate to its released position. If an adjustment were made during the preceding brake application, i.e., if the screw 36 were rotated counterclockwise through the action of the spring clutch which includes the sleeve 86, the sleeve is now rotated clockwise by the cam plate 44 an amount equal to the counterclockwise rotation without nullifying the initial adjustment since clockwise rotation of the spring 94 is the nonenergizing direction, permitting the spring 94 to slip relative to the screw 36. The heavy spring 92 is rotated in an energizing direction upon brake release to thereby drive the light spring 94 in a nonenergizing direction, the latter of which is slipping.

I claim:

1. In a disc brake:

a rotor having two friction faces, one on each side of the rotor;

two friction members positioned respectively adjacent said two friction faces;

a torque member;

a caliper housing slidably mounted on said torque member and operatively connected to said friction members for urging the members into engagement with their respective adjacent friction faces during a brake application;

said caliper housing defining a chamber and brake actuating mechanism in the chamber for advancing said friction members toward their respective adjacent friction faces;

said actuating mechanism including an extendible member slidably carried in the chamber and operatively connected to one of said friction members, said extendible member being formed of two relatively rotatable parts which extend one with respect to the other upon relative rotation therebetween, rotatable cam means in the chamber drivably connected to the extendible member for sliding the latter upon rotation of said cam means; and clutch mechanism for connecting the cam means to one of said parts upon brake application and for disconnecting the cam means upon brake release so that the latter can rotate relative to said one part, said clutch mechanism including lost motion means for permitting said cam means to initially rotate relative to said one part a predetermined distance upon brake application, and additional means for connecting said one part to said cam means for rotation therewith after said cam means is rotated through said predetermined distance, said clutch mechanism also including a pair of coil springs connected in series driving relationship between the cam means and said one part in such manner that the respective springs develop predetermined different torques for brake application and for brake release.

2. The invention of claim 1:

said extendible member having said two relatively rotatable parts joined adjustably by threads so that the torque resisting rotation of said one part is proportional to the actuating force transferred through said parts from the rotatable cam means to the friction members.

3. The invention of claim 2:

said one part defining a longitudinal bore;

two sleeves coaxially and rotatably disposed in the bore in end to end relationship;

one of said sleeves is operatively connected to the cam means;

the other of said sleeves is operatively connected to said one part through one of said coil springs;

said sleeves being connected at their adjacent ends by the other of said coil springs.

4. The invention of claim 3:

said longitudinal bore having spaced apart abutments therein between which the sleeves are disposed to confine the sleeves to a given axial position;

abutments in the bore and said one sleeve respectively between which the coil springs are disposed so that their remote ends are in engagement therewith, and a spacer located in said other sleeve member and disposed between adjacent ends of the springs.

5. The invention of claim 4:

a drag spring interconnected between the threads of the rotatable parts to establish a predetermined torque opposing relative rotation between said parts during brake release preventing rotation of said one part by the torque developed in said one spring which is now less than said predetermined opposing torque.

6. The invention of claim 5:

said coil springs being of such construction and having such a frictional engaging relationship to their respective engaging surfaces that during brake application the torque developed by said other coil spring is less than that developed by said one coil spring so that said other coil spring slips relative to said one part, and upon brake release the torque developed in the one coil spring is less than that developed in the other coil spring, thereby permitting the one coil spring to slip relative to the one part of said extendible member.

7. The invention of claim 6:

said one coil spring is of a lighter wire and is rotated in an energizing direction during a brake application and a nonenergizing direction during brake release, said other coil spring is of heavier wire and is rotated in a nonenergizing direction during a brake application and an energizing direction upon brake release.

8. The invention of claim 1:

said lost motion means including arcuate slots in said cam means having a prescribed length between their end walls, and said additional means including nibs projecting into said slots for engagement with their associated end walls after the cam means has rotated said predetermined distance.

9. The invention of claim 8:

said cam means including a lever mounted for rotation in one direction in effecting a brake application and in the opposite direction upon brake release.

10. The invention of claim 9:

said lever rotating relative to said springs for said predetermined distance of cam rotation during a brake application after which said two coil springs rotate said one part, said lever rotating relative to said one part upon brake release.

* * * * *